United States Patent [19]

Stoller

[11] Patent Number: 4,547,213

[45] Date of Patent: Oct. 15, 1985

[54] ROCK PHOSPHATE/SULFUR FERTILIZER COMPOSITION

[75] Inventor: Jerry H. Stoller, Bunkerhill, Tex.

[73] Assignee: Stoller Enterprises, Inc., Houston, Tex.

[21] Appl. No.: 475,142

[22] Filed: Mar. 14, 1983

[51] Int. Cl.$^4$ .................... C05B 17/00; A01N 25/02
[52] U.S. Cl. ................................ 71/53; 71/64.08; 71/64.13; 71/DIG. 1
[58] Field of Search ............ 71/33, 53, 64.01, 64.08, 71/64.13, DIG. 1

[56] References Cited

U.S. PATENT DOCUMENTS

| | | |
|---|---|---|
| 1,445,167 | 2/1923 | Plauson . |
| 1,777,908 | 10/1930 | Bodrero . |
| 2,097,446 | 11/1937 | Claiborne et al. ............... 71/33 |
| 2,161,035 | 6/1939 | Gilbert ....................... 71/64.13 X |
| 3,177,062 | 4/1965 | Hignett et al. ................ 71/33 |
| 3,799,884 | 3/1974 | Young ....................... 71/64.08 X |
| 4,372,872 | 2/1983 | Backlund ................... 71/64.08 X |

*Primary Examiner*—Donald R. Valentine
*Attorney, Agent, or Firm*—Kenneth H. Johnson

[57] ABSTRACT

A fertilizer composition which provides high soil mobility of phosphorus comprising an intimate mixture of 1 to 100 micron size ground rock phosphate and sufficient sulfur of 1 to 5 micron size in a weight ratio of $P_2O_5$:S in the range of 1:0.5 to 1:2.0 to convert said rock phosphate to a soluble form of phosphorus when said sulfur is oxidized by soil bacteria to sulfuric acid.

13 Claims, No Drawings

ROCK PHOSPHATE/SULFUR FERTILIZER COMPOSITION

BACKGROUND OF THE INVENTION

1. Field of the Invention

The present invention relates to fertilizer compositions which provide high phosphorus nutrient value to soil, in particular the invention relates to a composition of rock phosphate and sulfur.

Related Art

It has been long known that a mixture of rock phosphate and sulfur can serve as a source of phosphorus to soil in a form usable by plants. Furthermore, it is well known in agriculture to use ground rock phosphate (40–100 microns) on acid soil as a source of $P_2O_5$, with normal applications being 1500 to 2000 pounds per acre every three years.

U.S. Pat. No. 1,777,908 to Bordero discloses that mixtures of phosphate and sulfur in the form of finely divided or impalpable powder were used as fertilizers, however, to improve the state of division of the sulfur relative to the phosphate, the sulfur was sublimed onto the rock phosphate.

The mixture of phosphate and sulfur for soil enrichment was only marginally useful and with the development of the superphosphates it has not been a viable fertilizer composition or method of soil enrichment for years.

The problem which the farmer faces is obtaining high phosphate levels during a growing season (about 150 days). This has been met by a number of materials which are considered to be equal as sources of phosphate by the American Society of Agronomy, namely, normal super phosphate (0-18-0), triple super phosphate (0-46-0), phosphoric acid (0-54-0), diammonium phosphate (18-46-0), and monoammonium phosphate (11-52-0).

These materials are all manufactured products, whereas the rock phosphate is a ground mineral, hence, a substantially cheaper source of phosphate if it can be utilized to provide a high soil phosphate content. In a sufficiently acid soil the rock phosphate is useable, however, many soils are not acid and some treatments such as limestone application raise the pH to the point where rock phosphate is not practical.

In the present invention the utilization of sulfur of a very small and particular particle size is the central feature which allows the phosphate content of the rock phosphate to be utilized as a phosphate source during growing season in place of other phosphate sources.

The great advantage of the present improved mixture is the elimination of sulfuric acid plants, reduced air pollution, reduced cost, and reduced hazardous waste material at phosphate mines when the present compositions are substituted for superphosphate. An incidental benefit is an increase in calcium mobility in the soils with the present compositions. The present compositions have also been found to perform at substantially the same level for phosphorus availability as the superphosphates.

SUMMARY OF THE INVENTION

One aspect of the present invention is a fertilizer composition comprising an intimate mixture of ground rock phosphate containing phosphorus in a substantially water insoluble form and having a particle size in the range of 1 to 100 microns and sulfur having a particle size in the range of 1 to 5 microns, said rock phosphate, calculated on the basis of $P_2O_5$, and sulfur being present in the weight ratio of $P_2O_5$:S in the range of 1:0.5 to 1:2.0. The sulfur is generally present in an amount of at least 60% of the stoichiometric amount calculated as $H_2SO_4$ to convert the phosphate to a soluble phosphorus compound. An excess of sulfur may be present. Preferably sulfur content is about 70 to 200% of the stoichiometric amount calculated as $H_2SO_4$ based on the phosphorus present in the rock phosphate.

Another aspect of the present invention is a method of fertilization to provide improved soil phosphorus mobility comprising applying from about 100 to 800 pounds per acre of a composition as described above to soil.

The present compositions may be a dry mix or a water suspension thereof. The very fine particle size allows for the preparation and storage of solutions which are relatively stable, however, normal viscosifying materials such as hydroxyethyl cellulose and clays may be added to improve suspension stability.

In addition to the phosphate and sulfur other components such as urea, ammonium nitrate, potash, trace metals and the like which may be desirable nutrients for a crop may be added to the suspensions or dry mix as appropriate.

Rock phosphate is a mineral, which is generally given the chemical structure $Ca_3(PO_4)_2$, whitlockite, which is essentially insoluble in water, although the phosphorus present is reported as $P_2O_5$, as is conventional in the art. The sulfur employed is elemental sulfur and may be ordinary rhombic sulfur, although any form in the appropriate particle size may be use.

DETAILED DESCRIPTION OF THE INVENTION

In order for elemental sulfur to be reactive in soils, it must first be oxidized to sulfuric acid. This is accomplished largely by sulfur oxidizing bacteria of the genus Thiobacillus. In the presence of oxygen and water, the bacteria oxidize the sulfur to sulfuric acid which reacts with minerals and other insoluble materials, leading to nutrient mobilization. Thus, the oxidation increases the quantity of soluble phosphate, potassium, calcium, manganese, aluminum, magnesium, iron and zinc. Although other groups of microorganisms are responsible for sulfur oxidation, by far the most important are the chemautotrophic bacteria, namely: *Thiobacillus thiooxidans* and *Thiobacillus thioparus*. Thiobacilli are unique soil bacteria which can obtain their energy requirements for growth from the oxidation of inorganic sulfur compounds. Differences between the members of Thiobacilli include the degree of acid tolerance and the range of inorganic sulfur compounds which they are capable of oxidizing. *T. thiooxidans* and *T. thioparus* differ in one physiological characteristic and requirement, that being optimum pH range. The former thrives under extremely acid conditions with optimum pH ranging from 2-3.5, while the latter prefers a pH of around 7.0. Other than this, both species are aerobic, motile, autotrophic, gram negative, short rods.

In the chemoautotrophic bacteria, the oxidative process is the means by which energy is provided. Sulfates are formed as by-products of their metabolism. These sulfates are released into the soil as sulfuric acid. The result is a lowering of the pH.

In biological oxidation of sulfur, the general reactions that take place in the soil are as follows:

$$2S + 3O_2 \rightarrow 2SO_3$$

$$SO_3 + H_2O \rightarrow H_2SO_4$$

The sulfuric acid produced may react with tri calcium orthophosphate (rock phosphate) also called tri calcium phosphate, in the following way:

$$Ca_3(PO_4)_2 + 3H_2SO_4 \rightarrow 3CaSO_4 + 2H_3PO_4$$

The sulfuric acid formed reacts with insoluble rock phosphate leading to nutrient mobilization. The soluble form of phosphate may be phosphoric acid. This is a proposed mechanism and is not intended to limit the invention as described. The soluble phosphoric acid is a ready source of phosphorus for plants.

It has been found that the solubility of the phosphate in the rock phosphate (tri calcium orthophosphte) is directly proportional to the oxidation rate of the sulfur; and the oxidation rate of the sulfur is directly proportional to particle size. Sulfur of the size in the range of 1 to 5 microns as employed in the present composition produced lower soil pH than a 40±20 micron sulfur, e.g., pH 2.4 after 189 days at 5000 pounds per acre for the claimed sulfur and 3.8 for the 40±20 micron sulfur sandy acid soil. Thus indicating a more rapid reaction with soil bacteria for the present sulfur component than for a similar fine sulfur.

Another observation on these two micro sulfurs was that in a high lime clay soil, the present sulfur had a greater oxidation to SO4 after 75 days at a rate of 5000 pounds per acre than the 40±20 micron sulfur at 10,000 pounds per acre and 50% more oxidation than the 40±20 micron sulfur at the same rate of application.

A study was carried out comparing the present composition with super phosphate. A P deficient Cecil sandy soil (*Typic paleudult*) was used for both studies.

The composition according to the present invention was a blend of rock phosphate, particle size 20–40 microns (passes through 350 mesh), 1 part by weight and elemental sulfur, particle size 1-2 microns, 1.06 parts by weight to give a 0-18-0-14 (N-P2O5-K2O-S) fertilizer. The normal superphosphate was 0-18-0-12 analysis (sulfur was added as sulfuric acid during manufacture in the conventional manner.)

Plots were treated with fertilizer specified in the following tables and one month later planted with NK 1003 wheat at the rate of 1 bu/Ac. All plots were top dressed with 60 pounds of N as NH4NO3, three and one-half months thereafter. The test results are reported in TABLES I, II and III. In TABLE I the yield (bushels per acre), test weight (pounds per bushel) and test area, (grams per 1.5 square feet) are reported. In TABLES II and III, whole plant and tissue samples were dried at 70° C., ground to pass 20 mesh sieve for analysis by standard procedures.

The fertilizers compositions were applied as water suspensions. As can be seen from the TABLES, the present compositions give slightly better yields than conventional super phosphate-sulfur compositions.

The composition of the present invention produced the greatest increase of P in plant tissue during the early growth period, when phosphorus content is the greatest problem.

TABLE I

| TREATMENT EXAMPLE | YIELD BU/A | TEST WT. lb./Bu | TEST A g/1.5 |
|---|---|---|---|
| 1. Control | 37.0 | 52.9 | 48.2 |
| 2. 200 lbs/A Invention (36 lbs P2O5-38 lbs/A S) | 59.6 | 53.7 | 60.3 |
| 3. 400 lbs/A Invention (72 lbs P2O5-76 lbs/A S) | 57.3 | 53.2 | 63.2 |
| 4. 600 lbs/A Invention (108 lbs P2O5-114 lbs/A S) | 59.2 | 53.8 | 62/7 |
| 5. 400 lbs/A Super Phosphate (80 lbs P2O5-48 lbs/A S) | 56.0 | 52.8 | 57.3 |

TABLE II

| MONTH AFTER PLANTING Example | Phosphorus Content (%) | | | |
|---|---|---|---|---|
| | 1st Whole Plant | 4th Whole Plant | 5th Flag Leaf | 5th Whole Plant |
| 1. Control | .19 | .22 | .21 | .16 |
| 2. 200 lbs/A Invention (36 lbs P2O5-38 lbs/A S) | .24 | .28 | .23 | .17 |
| 3. 400 lbs/A Invention (72 lbs P2O5-76 lbs/A S) | .30 | .29 | .23 | .17 |
| 4. 600 lbs/A Invention (108 lbs P2O5-114 lbs/A S) | .28 | .29 | .23 | 17 |
| 5. 400 lbs/A Super (80 lbs P2O5-48 lbs/A S) | .20 | .27 | .23 | .15 |

TABLE III

| MONTH AFTER PLANTING Example | Sulfur Content (%) | | |
|---|---|---|---|
| | 4th Whole Plant | 5th Flag Leaf | 5th Whole Plant |
| 1. Control | 0.20 | 0.24 | 0.08 |
| 2. 200 lbs/A Invention (36 lbs P2O5-38 lbs/A S) | .25 | .27 | .13 |
| 3. 400 lbs/A Invention (72 lbs P2O5-76 lbs/A S) | .25 | .32 | .13 |
| 4. 600 lbs/A Invention (108 lbs P2O5-114 lbs/A S) | .29 | .34 | .14 |
| 5. 400 lbs/A Super (80 lbs P2O5-48 lbs/A S) | .25 | .26 | .12 |

The invention claimed is:

1. A fertilizer composition comprising an intimate mixture of fine particles of ground rock phosphate containing phosphorus in a substantially water insoluble form and having a particle size in the range of 1 to 100 microns and sulfur having a particle size in the range of 1 to 5 microns, said rock phosphate, calculated on the basis of P2O5, and sulfur being present in the weight ratio of P2O5:S in the range of 1:0.5 to 1:2.0.

2. The fertilizer composition according to claim 1 wherein said sulfur is present in an amount of at least 60% of the stoichiometric amount, calculated as H2SO4, to convert the phosphorus component of said rock phosphate to a water soluble phosphorus compound.

3. The fertilizer composition according to claim 2 wherein said sulfur is present in at least 70% of said stoichiometric amount.

4. The fertilizer composition according to claim 3 wherein water is present as a carrier.

5. The fertilizer composition according to claim 2 wherein said sulfur is present in from about 70 to 200% of said stoichiometric amount.

6. The fertilizer composition according to claim 5 wherein water is present as a carrier.

7. The fertilizer composition according to claim 2 wherein water is present as a carrier.

8. The fertilizer composition according to claim 1 wherein water is present as a carrier.

9. A method of fertilization to provide improved soil phosphorus mobility comprising applying from about 100 to 800 pounds per acre of a composition comprising an intimate mixture of fine particles of ground rock phosphate containing phosphorus in a substantially water insoluble form and having a particle size in the range of 1 to 100 microns and sulfur having a particle size in the range of 1 to 5 microns, said rock phosphate calculated as $P_2O_5$, and sulfur being present in the weight ratio of $P_2O_5$:S in the range of 1:0.5 to 1:2.0.

10. The method according to claim 9 wherein said sulfur is present in an amount of at least 60% of the stoichimetric amount, calculated as $H_2SO_4$, to convert said phosphorus component of rock phosphate to a water soluble phosphorus compound.

11. The method according to claim 9 wherein said fertilizer composition is applied as a water suspension.

12. The method according to claim 11 wherein said sulfur is present in at least 70% of said stoichiometric amount.

13. The method according to claim 12 wherein said sulfur is present in from about 70 to 200% of said stoichiometic amount.

* * * * *